（12）United States Patent
Tsai et al.

(10) Patent No.: US 12,021,941 B2
(45) Date of Patent: Jun. 25, 2024

(54) METHOD FOR OBTAINING ENRICHMENT INFORMATION AND CONTROLLER

(71) Applicant: Industrial Technology Research Institute, Hsinchu (TW)

(72) Inventors: Chang-Lan Tsai, Hsinchu County (TW); Kai-Wen Chen, Tainan (TW); Yu-Chieh Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 192 days.

(21) Appl. No.: 17/543,712

(22) Filed: Dec. 6, 2021

(65) Prior Publication Data

US 2023/0126312 A1 Apr. 27, 2023

(30) Foreign Application Priority Data

Oct. 27, 2021 (TW) .................................. 110139938

(51) Int. Cl.
*G06F 15/16* (2006.01)
*H04L 67/55* (2022.01)
(Continued)

(52) U.S. Cl.
CPC ............ *H04L 67/55* (2022.05); *H04L 67/564* (2022.05); *H04L 67/60* (2022.05); *H04W 8/18* (2013.01)

(58) Field of Classification Search
CPC ....... H04L 67/55; H04L 67/60; H04L 67/564; H04W 8/18
See application file for complete search history.

(56) References Cited

U.S. PATENT DOCUMENTS 7,107,149 B2 9/2006 Kubota
7,356,344 B2 4/2008 Sato
(Continued)

FOREIGN PATENT DOCUMENTS

CN 101536591 9/2009
TW 201937888 9/2019
(Continued)

OTHER PUBLICATIONS

Ming Fei et al., "Position-assisted fast handover schemes for LTE-advanced network under high mobility scenarios," Journal of Modern Transportation, vol. 20, No. 4, Dec. 2012, pp. 268-273.
(Continued)

*Primary Examiner* — Oleg Survillo
(74) *Attorney, Agent, or Firm* — JCIPRNET

(57) ABSTRACT

A method for obtaining enrichment information and a controller are provided. The method includes: querying, by an enrichment information handling circuit, whether a database stores a first enrichment information corresponding to a user device in response to the enrichment information handling circuit receiving a first creation request associated with the user device from an application; triggering, by the enrichment information handling circuit, the application to subscribe to the database for enrichment information corresponding to the user device in response to determining that the database stores the first enrichment information corresponding to the user device; and pushing, by the database, second enrichment information to the application in response to presence of the second enrichment information corresponding to the user device in the database.

25 Claims, 11 Drawing Sheets

(51) Int. Cl.
*H04L 67/564* (2022.01)
*H04L 67/60* (2022.01)
*H04W 8/18* (2009.01)

(56) References Cited

U.S. PATENT DOCUMENTS

| | | | |
|---|---|---|---|
| 8,055,246 B2 | 11/2011 | Takehara et al. | |
| 8,787,944 B2 | 7/2014 | Smith | |
| 9,107,101 B2 | 8/2015 | Aoyama | |
| 9,602,990 B2 | 3/2017 | Fischer et al. | |
| 9,759,817 B2 | 9/2017 | Lau et al. | |
| 9,918,235 B2 | 3/2018 | Brennan et al. | |
| 10,863,421 B2 | 12/2020 | Park et al. | |
| 2002/0016839 A1* | 2/2002 | Smith | G06Q 40/00 709/224 |
| 2012/0173666 A1* | 7/2012 | Jellison, Jr. | H04N 21/25 709/217 |
| 2013/0173799 A1* | 7/2013 | Lamotte | H04N 21/4788 709/225 |
| 2016/0094581 A1 | 3/2016 | Kasbekar | |
| 2021/0014912 A1 | 1/2021 | Song et al. | |
| 2021/0184989 A1 | 6/2021 | Wu et al. | |
| 2021/0234803 A1 | 7/2021 | Parekh et al. | |
| 2022/0012645 A1* | 1/2022 | Ying | G06N 20/20 |
| 2022/0014942 A1* | 1/2022 | Ying | H04L 67/55 |
| 2022/0295309 A1* | 9/2022 | Akhtar | H04W 24/02 |
| 2022/0322172 A1* | 10/2022 | Parekh | H04W 28/0215 |
| 2022/0342732 A1* | 10/2022 | Subramani Jayavelu | G06F 9/546 |
| 2022/0400372 A1* | 12/2022 | Cai | H04L 67/10 |
| 2023/0069604 A1* | 3/2023 | Subramani Jayavelu | G06F 9/547 |
| 2023/0110387 A1* | 4/2023 | Urie | H04W 48/02 455/418 |
| 2023/0232383 A1* | 7/2023 | Akhtar | H04W 72/0453 455/452.1 |

FOREIGN PATENT DOCUMENTS

| | | |
|---|---|---|
| TW | 202135580 | 9/2021 |
| WO | 2021048831 | 3/2021 |

OTHER PUBLICATIONS

Yuzhe Zhou et al., "A position-based access scheme for high-speed railway communications," 2014 IEEE International Conference on Signal Processing, Communications and Computing (ICSPCC), Aug. 5-8, 2014, pp. 608-612.

Wenbin Dong et al., "An Enhanced Handover Scheme for Cellular-Connected UAVs," 2020 IEEE/CIC International Conference on Communications in China (ICCC), Aug. 9-11, 2020, pp. 418-423.

Md Moin Uddin Chowdhury et al., "Mobility Management for Cellular-Connected UAVs: A Learning-Based Approach," 2020 IEEE International Conference on Communications Workshops (ICC Workshops), Jun. 7-11, 2020, pp. 1-6.

S. G. Niri et al., "Position assisted handover algorithm for multi layer cell architecture," Gateway to 21st Century Communications Village. VTC 1999—Fall. IEEE VTS 50th Vehicular Technology Conference (Cat. No. 99CH36324), Sep. 19-22, 1999, pp. 569-572.

Yi Lu et al., "Feasibility of Location-Aware Handover for Autonomous Vehicles in Industrial Multi-Radio Environments," Sensors, vol. 20, No. 21, 6290, Nov. 2020 pp. 1-22.

O-RAN Alliance, "Technical Specification, O-RAN Working Group 2, A1 interface: Application Protocol," O-RAN. WG2.A1AP-v03. 00, Nov. 2020, pp. 1-89.

O-RAN Alliance, "Technical Specification, O-RAN Architecture Description," O-RAN.WG1.O-RAN-Architecture-Description-v04. 00, Mar. 2021, pp. 1-33.

"Office Action of Taiwan Counterpart Application", issued on Aug. 4, 2022, p. 1-p. 3.

"Notice of allowance of Japan Counterpart Application", issued on Dec. 27, 2022, p. 1.

* cited by examiner

METHOD FOR OBTAINING ENRICHMENT INFORMATION AND CONTROLLER

CROSS-REFERENCE TO RELATED APPLICATION

This application claims the priority benefit of Taiwan application serial no. 110139938, filed on Oct. 27, 2021. The entirety of the above-mentioned patent application is hereby incorporated by reference herein and made a part of this specification.

TECHNICAL FIELD

The disclosure relates to an enrichment information (EI) processing technology.

BACKGROUND

The characteristics of large bandwidth, low latency, multiple connections, and multiple frame structures provided by 5G may meet a variety of applications with different needs. However, due to the different requirements of various applications, device differences, environmental changes, etc., it is difficult to design the best configuration (system parameters, such as handover measurement and handover timing) in advance to achieve the best performance.

Starting from the maintenance needs of operators, the O-RAN Alliance proposes a 5G communication system architecture with software/hardware deconstruction and network function virtualization, as well as two management components: the service management and orchestration (SMO) and the radio access network (RAN) intelligent controller (RIC). According to the deployment environment and real-time usage conditions, network performance may be analyzed and predicted, and active network configuration or control may be adopted to maintain the quality required by various applications. In addition to obtaining available information from RAN, SMO and RIC are also allowed to make better judgments and decisions if the enrichment information (EI) may be supplemented from outside the network.

RIC may manage the use of wireless resources of the base stations, such as a handover policy, a change in the amount of use of the wireless resources, quality of service (QoS) limitation, and other applications. If external information and enrichment information are needed to improve performance, RIC itself must provide a unified, convenient, and efficient interface and procedures, including enrichment information type query, initiation of requests, information update, task establishment, task deletion, etc.

Therefore, how to design the abovementioned interface and program for RIC is an important issue for a person having ordinary skill in the art.

SUMMARY

In view of the above, the disclosure provides a method for obtaining enrichment information and a controller configured to solve the above technical problems.

The disclosure provides a method for obtaining enrichment information, and the method includes an enrichment information handling circuit and a controller of a database. The method includes the following steps. In response to the enrichment information handling circuit receiving a first creation request associated with the first user device from a first application, the enrichment information handling circuit queries whether the database stores a first enrichment information corresponding to a first user device. In response to determining that the database stores the first enrichment information corresponding to the first user device, the enrichment information handling circuit triggers the first application to subscribe to the database for enrichment information corresponding to the first user device. In response to presence of a second enrichment information corresponding to the first user device in the database, the database pushes the second enrichment information to the first application.

The disclosure provides a controller for obtaining enrichment information, and the controller includes a database and an enrichment information handling circuit. The enrichment information handling circuit is coupled to the database. In response to the enrichment information handling circuit receiving a first creation request associated with the first user device from a first application, the enrichment information handling circuit queries whether the database stores a first enrichment information corresponding to a first user device. In response to determining that the database stores the first enrichment information corresponding to the first user device, the enrichment information handling circuit triggers the first application to subscribe to the database for enrichment information corresponding to the first user device. In response to presence of a second enrichment information corresponding to the first user device in the database, the database pushes the second enrichment information to the first application.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

The O-RAN Alliance is an alliance dominated by operators, calling on equipment vendors to join to jointly define an open interface and an automatic and intelligent network management architecture. The O-RAN architecture proposed by the O-RAN Alliance is shown in FIG. 1.

Figure 1:
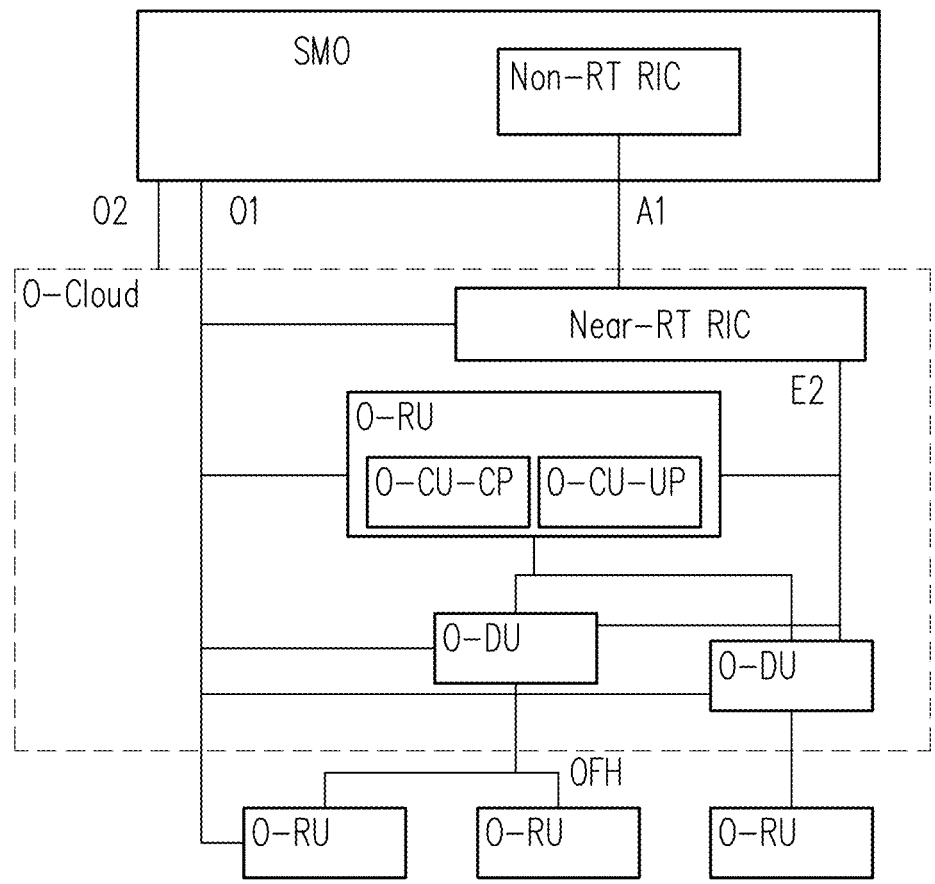
FIG. 1 is a diagram illustrating an architecture of an open radio access network (O-RAN).

The O-RAN architecture shown in FIG. 1 includes service management and orchestration (SMO), a non-real-time radio access network intelligent controller (non-RT RIC), a near-real-time radio access network intelligent controller (near-RT RIC), an O-RAN central unit (O-CU), an O-RAN distributed unit (O-DU), and an O-RAN radio unit (O-RU).

The SMO may communicate with each managed component through the O1 interface to achieve behaviors, such as (1) fault (error), configuration, accounting, performance, and fault management (FCAPS management) and safety management; (2) collection of performance data and access to a network and user performance data. In addition, the SMO may communicate with a cloud platform (O-RAN Cloud, O-Cloud) through an O2 interface to achieve behaviors such as orchestrating cloud platform resources.

The non-RT RIC may communicate with near-RT RIC through an A1 interface. In some embodiments, the non-RT RIC transmits an A1 policy to the near-RT RIC through the A1 interface. The A1 policy includes, but not limited to, quality of service (QoS), quality of experience (QoE), traffic steering, etc.

Besides, the non-RT RIC may provide enrichment information to the near-RT RIC through the A1 interface after obtaining the enrichment information from external sources. Two kinds of enrichment information objects are provided in an enrichment information related specification: (1) an enrichment information type object (ET type object) and (2) an enrichment information job object (EI job object). The enrichment information type object includes an EI type identifier and a schema. The enrichment information job object includes an EI type identifier, an enrichment information transmission uniform resource identifier (URI), and enrichment information job definition, etc. The enrichment information job definition may include a scope, requirement parameters, and conditions.

In addition, the non-RT RIC may further train a machine learning model, execute a machine learning model, or configure a machine learning model to the near-RT RIC, so that the near-RT RIC may execute the machine learning model, but it is not limited thereto.

The near-RT RIC may communicate with the O-CU and O-DU through an E2 interface to realize (1) collection, analysis, and monitoring of network information and user information from the O-CU and O-DU and (2) operations such as controlling of O-CU and O-DU behaviors or parameters.

In addition, the near-RT RIC may run applications (xApps) to realize the radio resource management (RRM) function. Further, the near-RT RIC may also provide an application programming interface (API) for interacting with the xApps.

The O-CU, O-DU, and O-RU may respectively support the functions of a centralized unit/distributed unit/and radio unit defined by 3GPP and may all support an O1 interface. Besides, the O-CU may be further divided into a control unit (O-RAN central unit control plane, O-CU-CP) and a user unit (O-RAN central unit user plane, O-CU-UP). Moreover, the O-DU and O-RU support an open-fronthaul interface (OFH interface) defined by O-RAN.

Figure 2:
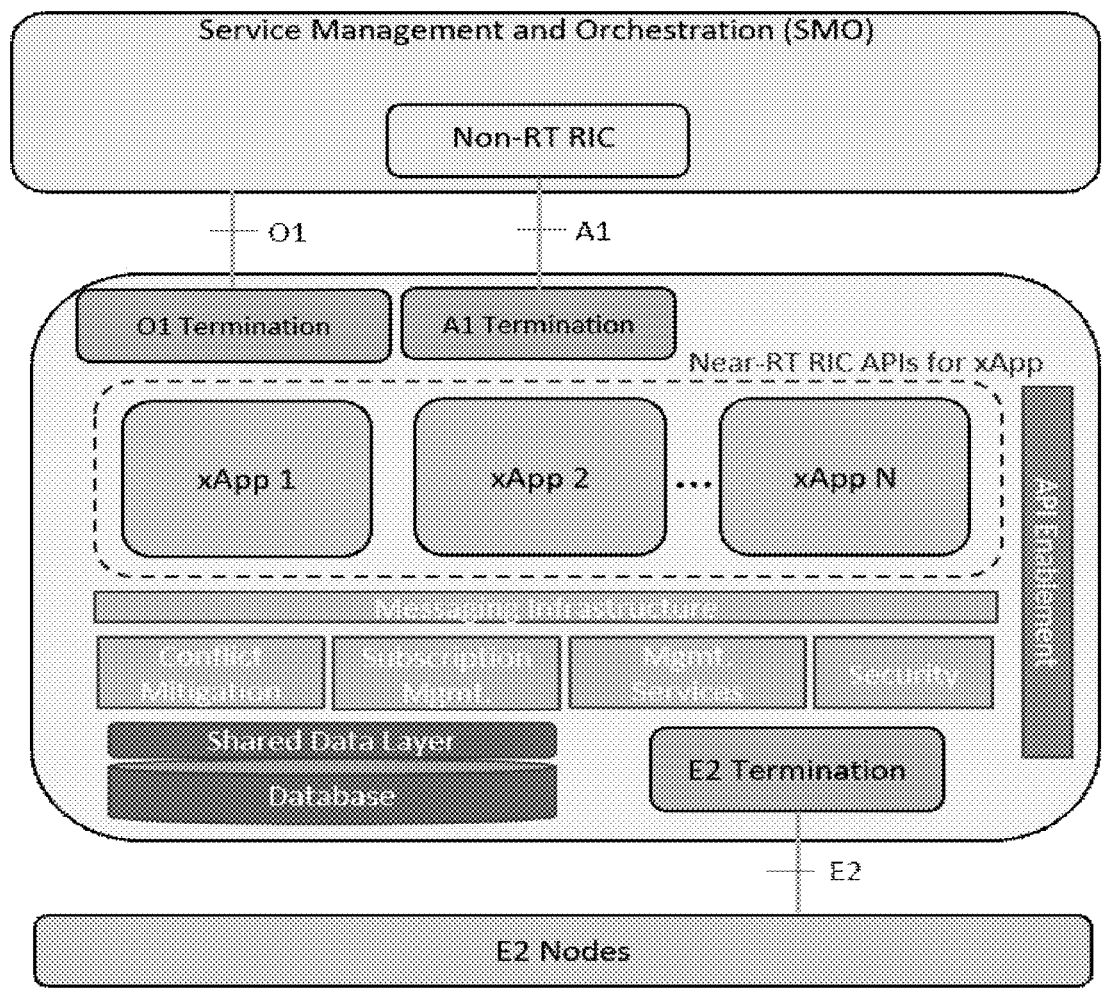
FIG. 2 is a diagram illustrating an internal architecture of a near-real-time radio access network intelligent controller (near-RT RIC).
Figure 3:
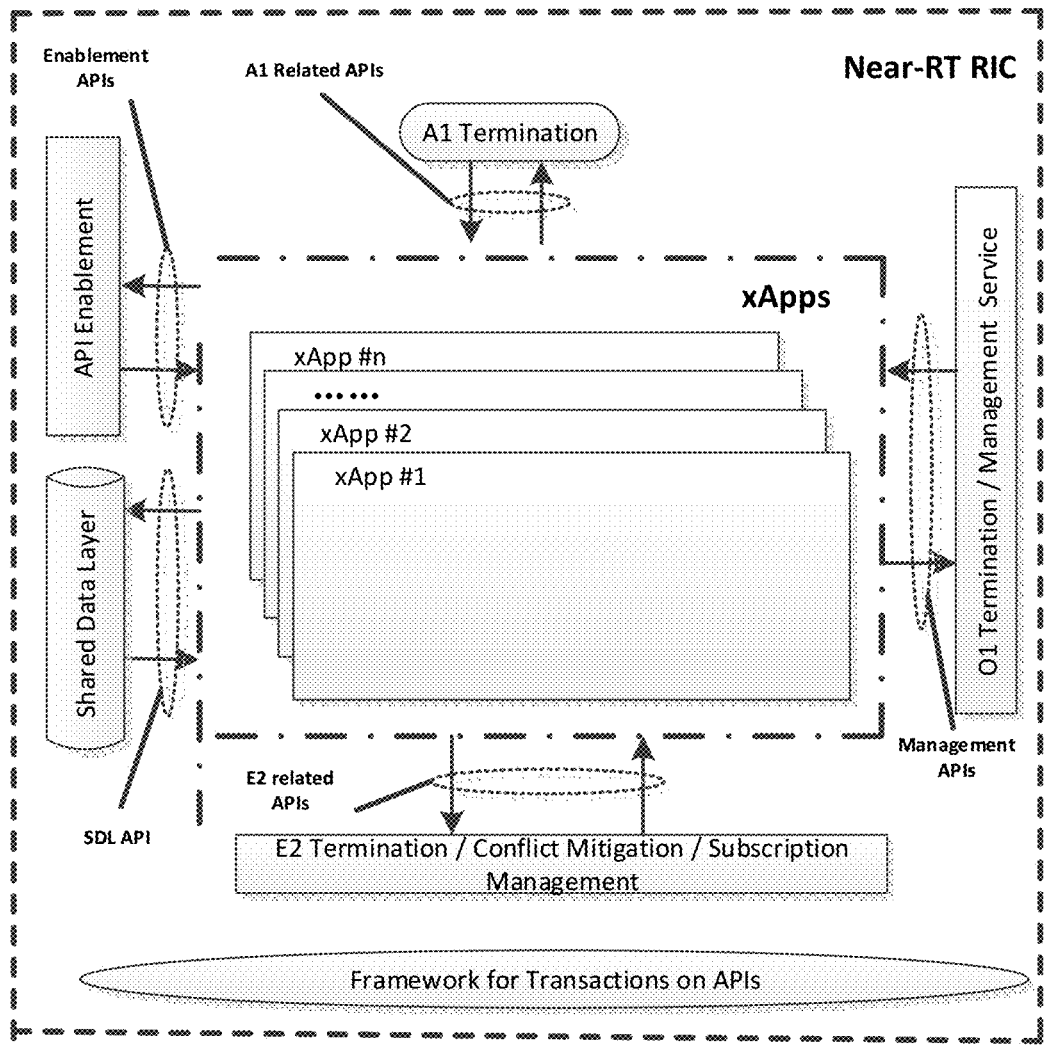
FIG. 3 is a diagram illustrating various application programming interfaces (APIs) in the near-RT RIC.

With reference to FIG. 2 and FIG. 3, FIG. 2 is a diagram illustrating an internal architecture of a near-RT RIC, and FIG. 3 is a diagram illustrating various APIs in the near-RT RIC. As shown in FIG. 2 and FIG. 3, the near-RT RIC includes basic function and applications (xApps). The APIs are interfaces that support the xApps and are divided into five categories: A1 Related APIs, E2 Related APIs, management APIs, enablement APIs, and shared data layer (SDL) APIs.

Regarding the A1 interface, currently, the O-RAN Alliance has defined related APIs and procedures such as A1 policy setup, A1 policy update, and A1 policy deletion. Regarding the SDL, the O-RAN Alliance has defined APIs and procedures such as SDL client registration/deregistration, data fetching/storing/modifying, subscription/notification, subscription/push, etc.

Details of the content of FIG. 1 to FIG. 3 may be found with reference to "0-RAN.WG1.O-RAN-Architecture-Description-v04.00" and "O-RAN.WG2.A1AP-v03.00", and the content is incorporated into the specification by reference and thus is not be repeated herein.

However, in the related specifications of O-RAN, the mechanism for the xApps to process enrichment information through APIs is not defined. In view of the above, the disclosure provides a method for obtaining enrichment information and a controller configured to solve the above technical problems.

Figure 4:
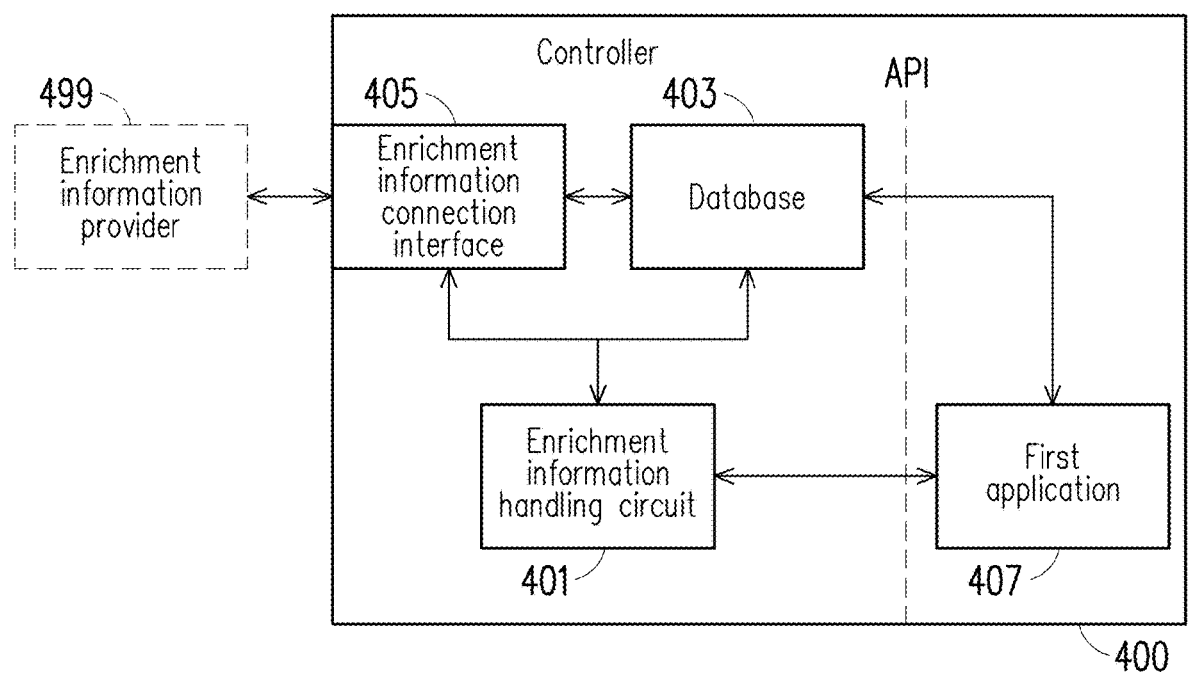
FIG. 4 is a schematic diagram illustrating a controller according to an exemplary embodiment of the disclosure.

With reference to FIG. 4, which is a schematic diagram illustrating a controller according to an exemplary embodiment of the disclosure. In the embodiments of the disclosure, a controller 400 may be a RAN controller of various types, such as a RIC, but may not be limited thereto. As shown in FIG. 4, the controller 400 includes an enrichment information handling circuit 401, a database 403, an enrichment information connection interface 405, and a first application 407.

In FIG. 4, the enrichment information handling circuit 401, the database 403, and the enrichment information connection interface 405 may be connected to one another. In some embodiments, the enrichment information connection interface 405 may be configured to be connected to an enrichment information provider 499 outside the controller 400. In an embodiment, after obtaining enrichment information of specific devices, the enrichment information provider 499 may send the obtained enrichment information to the enrichment information connection interface 405, and the enrichment information connection interface 405 may, for example, provide the enrichment information to the enrichment information handling circuit 401 and the database 403 for subsequent use, but it is not limited thereto.

In some embodiments, the database 403 is, for example, a database corresponding to the SDL, and may be used to store the abovementioned enrichment information, but it is not limited thereto.

In the embodiments of the disclosure, the controller 400 may run a plurality of applications (i.e., the xApps), and the first application 407 is, for example, one of these xApps. For ease of understanding, the following takes the first application 407 as an example to illustrate the way it interacts with the enrichment information handling circuit 401, the database 403, and the enrichment information connection interface 405, and a person having ordinary skill in the art should be able to deduce other ways for the xApps to interact with the enrichment information handling circuit 401, the database 403, and the enrichment information connection interface 405 accordingly.

Figure 5:
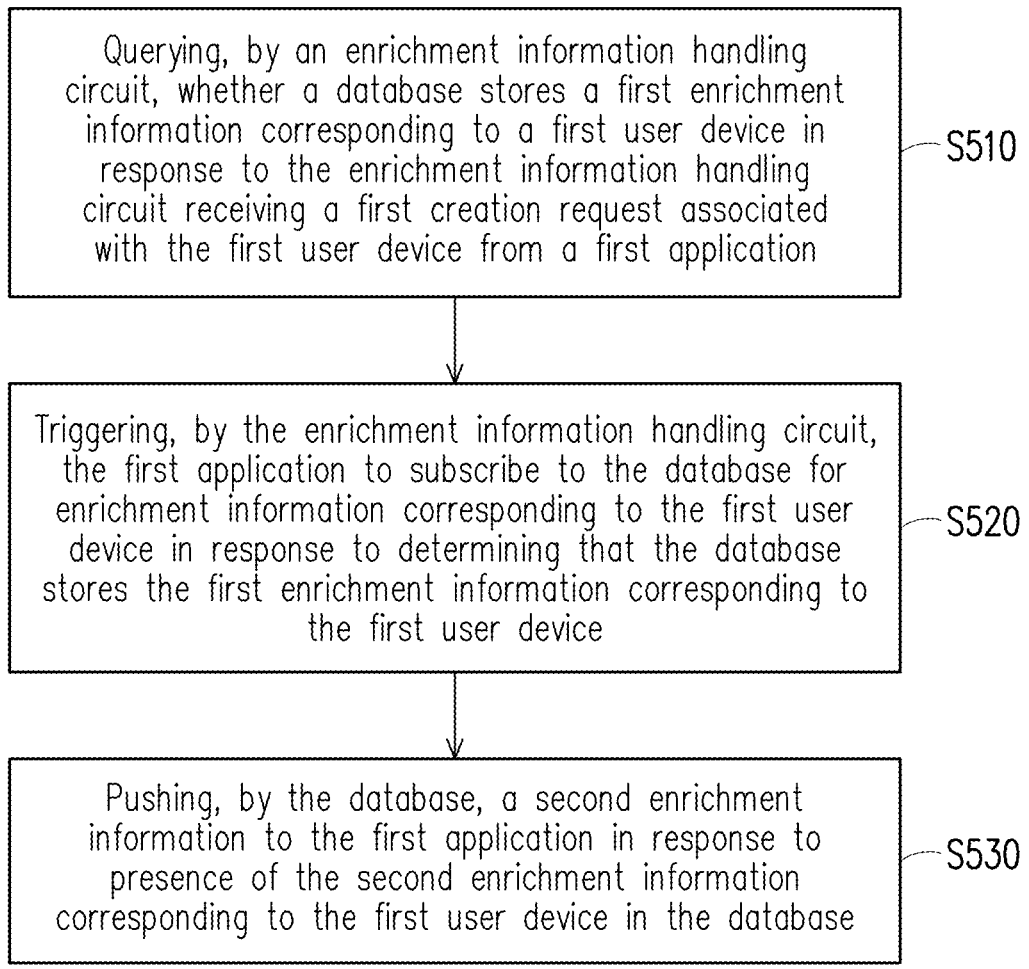
FIG. 5 is a flow chart illustrating a method for obtaining enrichment information according to an exemplary embodiment of the disclosure.

With reference to FIG. 5, which is a flow chart illustrating a method for obtaining enrichment information according to an exemplary embodiment of the disclosure. The method provided by this embodiment may be executed by the controller 400 in FIG. 4, and each step in FIG. 5 is described in detail together with the elements shown in FIG. 4.

First, in step S510, in response to the enrichment information handling circuit 401 receiving a first creation request CRQ1 associated with a first user device D1 from the first application 407, the enrichment information handling circuit 401 queries whether the database 403 stores a first enrichment information corresponding to the first user device D1.

In step S520, in response to determining that the database 403 stores the first enrichment information corresponding to the first user device D1, the enrichment information handling circuit 401 triggers the first application 407 to subscribe to the database 403 for enrichment information corresponding to the first user device D1.

In step S530, in response to presence of a second enrichment information corresponding to the first user device D1 in the database 403, the database 403 pushes the second enrichment information to the first application 407.

Figure 6:
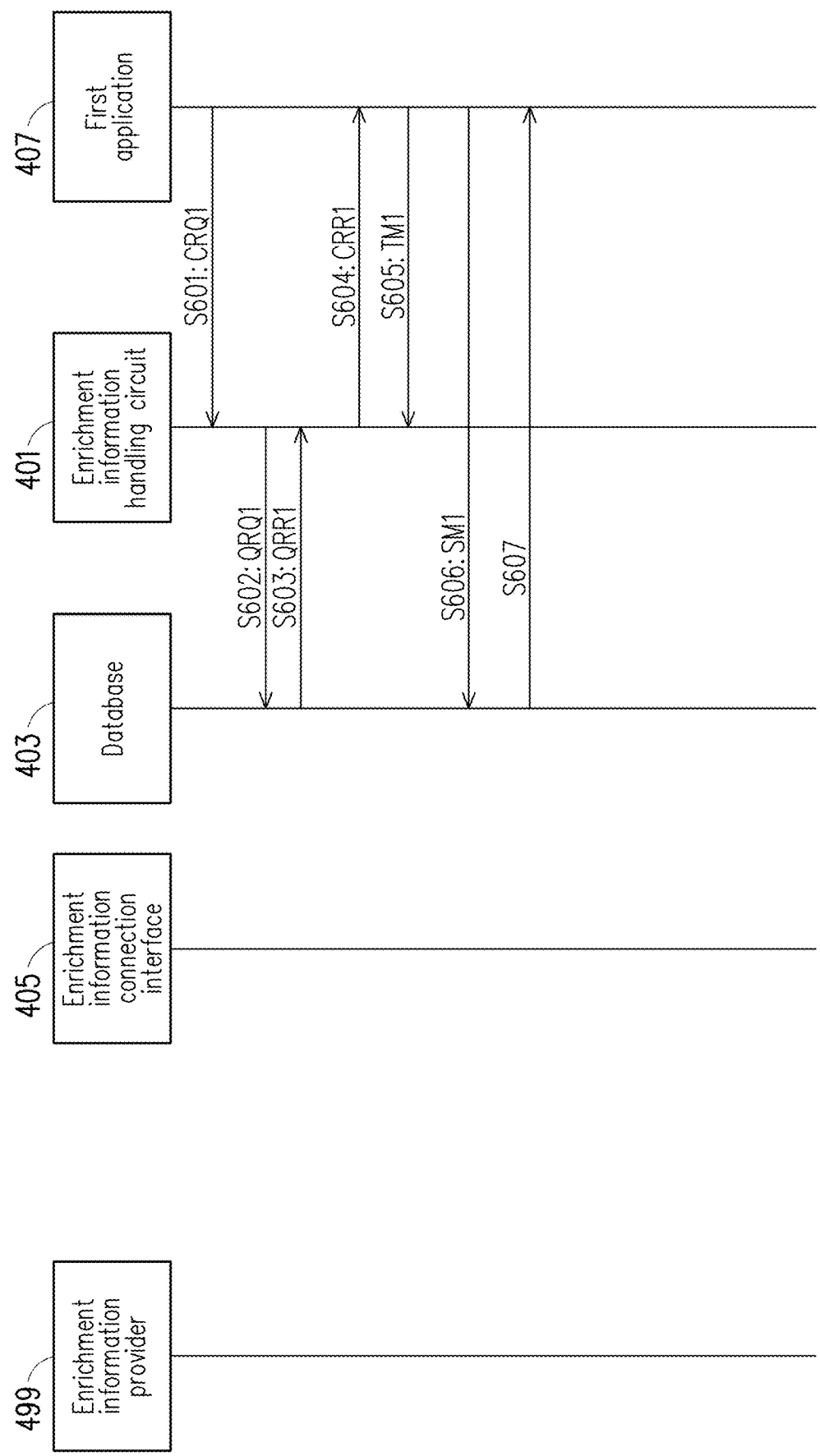
FIG. 6 is a diagram illustrating an application scenario according to a first embodiment of the disclosure.

In order to make the above concepts easier to understand, the following is supplemented with FIG. 6 for further explanation, and FIG. 6 is a diagram illustrating an application scenario according to a first embodiment of the disclosure.

In FIG. 6, it is assumed that the first application 407 needs the enrichment information of the first user device D1, so the first application 407 may send the first creation request CRQ1 associated with the first user device D1 to the enrichment information handling circuit 401 in step S601.

In an embodiment, the first creation request CRQ1 may instructs at least one of an enrichment information type, a device identity of the first user device D1, an enrichment information format, a reply instruction, a reply period, and a timestamp instruction. In some embodiments, the reply instruction may instruct whether to reply to the first application 407 immediately after the enrichment information of the first user device D1 is obtained. The reply period may instruct a period for obtaining the enrichment information of the first user device D1. The timestamp instruction may instruct whether to add a timestamp to the enrichment information of the first user device D1.

In an embodiment, the first creation request CRQ1 may be configured to request creation of a first enrichment information job object OB1 corresponding to the first user device D1. Further, the first enrichment information job object OB1 includes at least one of the enrichment information type, a job return URL (e.g., URI), a job status reminder URL, an information format type, the reply instruction, the reply period, and the timestamp instruction.

When the enrichment information handling circuit 401 receives the first creation request CRQ1, the enrichment information handling circuit 401 may send a first query request QRQ1 to the database 403 in response to the first creation request CRQ1 in step S602. The first query request QRQ1 may be configured to query whether the database 403 stores the first enrichment information corresponding to the first user device D1.

Correspondingly, the database 403 may query whether the database 403 stores the first enrichment information corresponding to the first user device D1 in response to the first query request QRQ1 and sends a first query response QRR1 to the enrichment information handling circuit 401 according to a first query result of the first query request QRQ1 in step S603.

In some embodiments, the first query request QRQ1 may include the device identity of the first user device D1 and an object identity of the first enrichment information job object OB1. In addition, the first query response QRR1 may include the device identity of the first user device, the object identity of the first enrichment information job object OB1, and a query status field. The query status field may instruct whether the database 403 stores the first enrichment information corresponding to the first user device D1. In an embodiment, when the query status field is a first value (e.g., 1), it may mean that the database 403 stores the first enrichment information corresponding to the first user device D1. Further, when the query status field is a second value (e.g., 0), it may mean that the database 403 does not store the first enrichment information corresponding to the first user device D1, but it is not limited thereto.

For ease of description, it is assumed that the database 403 stores the first enrichment information corresponding to the first user device D1 in FIG. 6. In this case, the query status field of the first query response QRR1 may be set to the first value through the database 403, so as to notify the enrichment information handling circuit 401.

When the enrichment information handling circuit 401 receives the first query response QRR1, the enrichment information handling circuit 401 may determine that the first query response QRR1 instructs that the database 403 stores the first enrichment information corresponding to the first user device D1 according the query status field presented as the first value, so as to further determine that the database 403 stores the first enrichment information corresponding to the first user device D1.

In this case, the enrichment information handling circuit 401 may send a first creation response CRR1 to the first application 407 in step S604. In an embodiment, the first creation response CRR1 may include the enrichment information type, the object identity of the first enrichment information job object OB1, job content of the first enrichment information job object OB1, and a creation status field. The creation status field may instruct whether the first enrichment information job object OB1 is successfully created.

In an embodiment, when the creation status field is the first value (e.g., 1), it may mean that the first enrichment information job object OB1 is successfully created. Further, when the creation status field is the second value (e.g., 0), it may mean that the first enrichment information job object OB1 is not successfully created, but it is not limited thereto.

In the scenario of FIG. 6, since the database 403 stores the first enrichment information corresponding to the first user device D1, this means that the first enrichment information work object OB1 is created. Therefore, the enrichment information handling circuit 401 may set the creation status field of the first creation response CRR1 to the first value to notify the first application 407.

In an embodiment, in response to the first application 407 determines that the first creation response CRR1 instructs that the first enrichment information job object OB1 is successfully created, the first application may send a first tracking message TM1 corresponding to the first enrichment information job object OB1 to the enrichment information handling circuit 401 in step S605. In an embodiment, the first tracking message TM1 may instruct the object identity of the first enrichment information job object OB1 and is configured to register and track the enrichment information of the first user device D1 with the enrichment information handling circuit 401.

Next, in step S606, the first application 407 may send a first subscription message SM1 to the database 403. The first subscription message SM1 instructs to subscribe to the database 403 for the enrichment information corresponding to the first user device D1.

Next, in step S607, in response to presence of the second enrichment information corresponding to the first user device D1 in the database 403, the database 403 may push the second enrichment information to the first application 407.

In FIG. 6, the first application 407 and the enrichment information handling circuit 401 may send various requests/responses/messages as shown through APIs related to the enrichment information. Besides, the first application 407 and the enrichment information handling circuit 401 may individually exchange various data as shown with the database 403 through APIs related to the SDL.

Figure 7A:
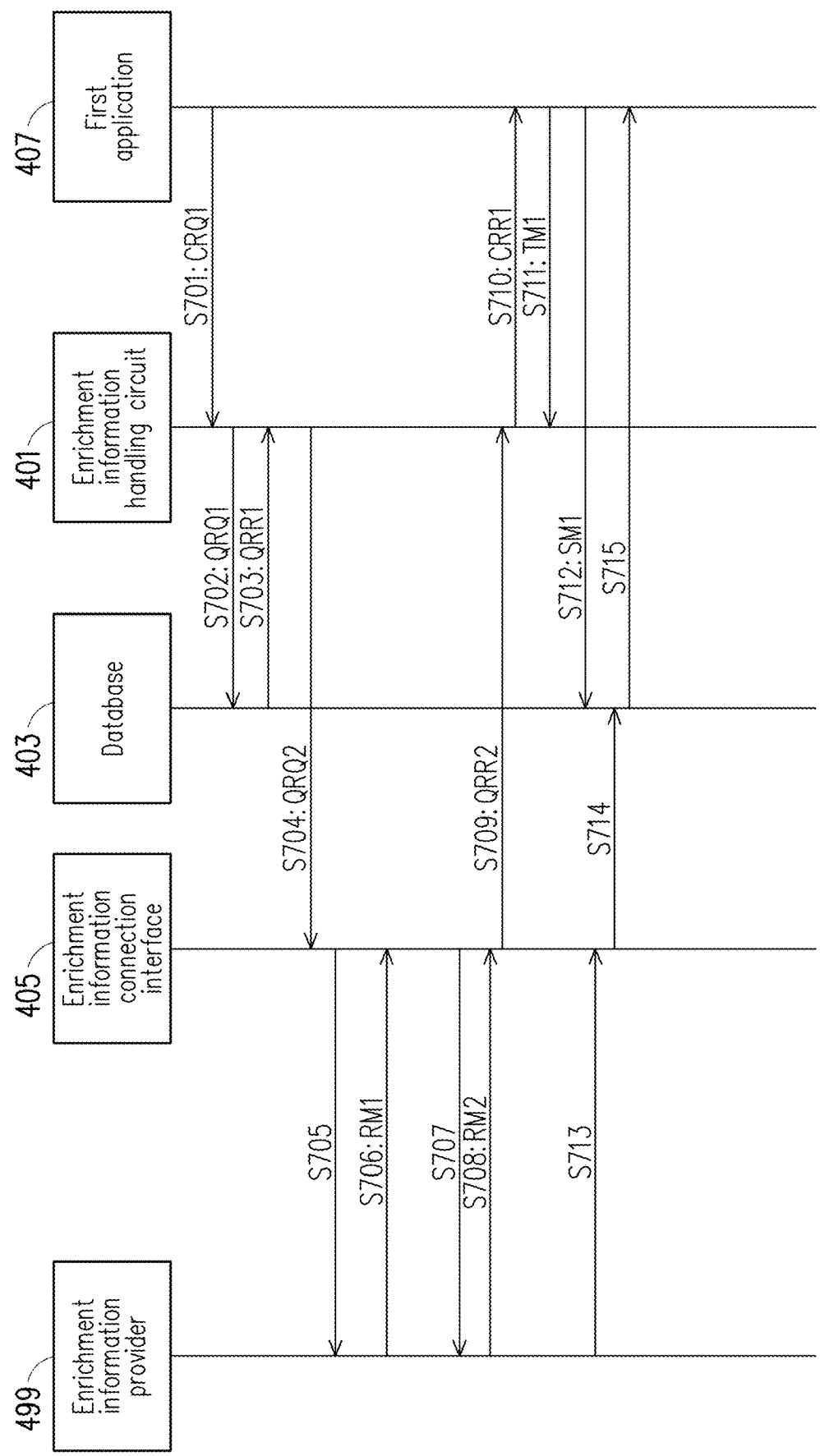
FIG. 7A is a diagram illustrating an application scenario according to a second embodiment of the disclosure.

With reference to FIG. 7A, which is a diagram illustrating an application scenario according to a second embodiment of the disclosure. In step S701, the first application 407 may send the first creation request CRQ1 associated with the first user device D1 to the enrichment information handling circuit 401. In step S702, the enrichment information handling circuit 401 may send the first query request QRQ1 to the database 403 in response to the first creation request CRQ1. In step S703, the database 403 may send the first query response QRR1 to the enrichment information handling circuit 401 according to a first query result of the first query request QRQ1. The content of steps S701 to S703 may be found with reference to the description related to steps S601 to S603 in FIG. 6, so description thereof is not repeated herein.

In the scenario of FIG. 7A, it is assumed that in the database 403 does not store the first enrichment information corresponding to the first user device D1. In this case, the query status field of the first query response QRR1 may be set to the second value through the database 403, so as to notify the enrichment information handling circuit 401.

When the enrichment information handling circuit 401 receives the first query response QRR1, the enrichment information handling circuit 401 may determine that the first query response QRR1 instructs that the database 403 does not store the first enrichment information corresponding to the first user device D1 according the query status field presented as the second value, so as to further determine that the database 403 does not store the first enrichment information corresponding to the first user device D1 (i.e., the first enrichment information job object OB1 is not created yet).

In this case, the enrichment information handling circuit 401 may send a second query request QRQ2 to the enrichment information connection interface 405. The second query request QRQ2 may instruct the enrichment information type. Correspondingly, in step S705, the enrichment information connection interface 405 may query whether the enrichment information provider 499 supports the enrichment information type.

In different embodiments, the enrichment information provider 499 may return a first response message RM1 to the enrichment information connection interface 405 in step S706 based on whether the enrichment information provider 499 itself supports the aforementioned enrichment information type.

In the scenario of FIG. 7A, it is assumed that the first response message RM1 instructs that the enrichment information provider 499 supports the enrichment information type. In this case, the enrichment information connection interface 405 may request the enrichment information provider 499 to create the first enrichment information job object OB1 in step S707. In other embodiments, if the first response message RM1 instructs that the enrichment information provider 499 does not support the enrichment information type, the mechanism shown in FIG. 7B may be correspondingly executed in this embodiment, and details thereof is to be described in following paragraphs.

In FIG. 7A, after the enrichment information provider 499 completes creation of the first enrichment information job object OB1 according to the request made by the enrichment information connection interface 405, the enrichment information provide 499 may return a second response message RM2 to the enrichment information connection interface 405 to notify the enrichment information connection interface 405 in step S708.

Thereafter, the enrichment information connection interface 405 may send the second query response QRR2 to the enrichment information handling circuit 401 in step S709. In an embodiment, the second query response QRR2 may instruct successful creation of the first enrichment information job object OB1 and includes the enrichment information type, the object identity of the first enrichment information job object OB1, and the job content of the first enrichment information job object OB1.

Next, in step S710, the enrichment information handling circuit 401 may send the first creation response CRR1 to the first application 407. In step S711, the first application may send the first tracking message TM1 corresponding to the first enrichment information job object OB1 to the enrichment information handling circuit 401. In step S712, the first application 407 may send the first subscription message SM1 to the database 403.

The content of steps S710 to S712 may be found with reference to the description related to steps S604 to S606 in FIG. 6, so description thereof is not repeated herein.

In step 7A, when the enrichment information provider 499 obtains the second enrichment information of the first user device D1, the enrichment information provider 499 may send the second enrichment information to the enrichment information connection interface 405 in step S713. In an embodiment, the second enrichment information may include the device identity of the first user device D1, status information of the first user device D1, and a timestamp. In some embodiments, the status information of the first user device D1 includes, for example, location information of the first user device D1 corresponding to the timestamp, but it is not limited thereto.

In an embodiment, when the enrichment information connection interface 405 receives the second enrichment information from the enrichment information provider 499 in step S713, the enrichment information connection interface 405 may store the second enrichment information to the database 403 in step S714.

Next, in step S715, in response to presence of the second enrichment information corresponding to the first user device D1 in the database 403, the database 403 may push the second enrichment information to the first application 407.

Figure 7B:
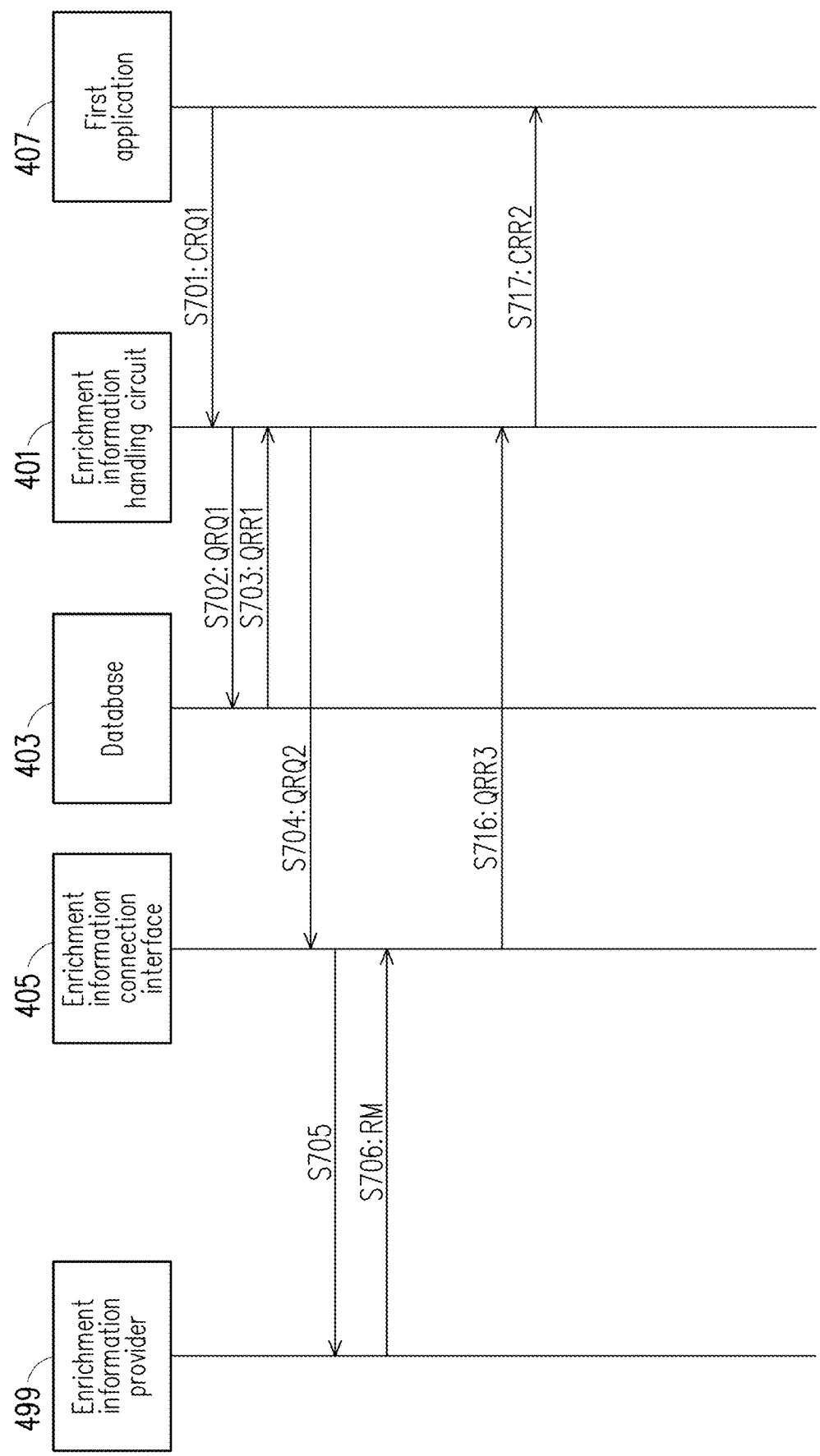
FIG. 7B is a diagram illustrating another application scenario according to the second embodiment of the disclosure.

With reference to FIG. 7B, which is a diagram illustrating another application scenario according to the second embodiment of the disclosure. In FIG. 7B, the content of steps S701 to S706 may be found with reference to the description related to FIG. 7A, so description thereof is not repeated herein. In this embodiment, it is assumed that the first response message RM1 instructs that the enrichment information provider 499 does not support the enrichment information type. In this case, the enrichment information connection interface 405 may send a third query response QRR3 to the enrichment information handling circuit 401 in step S716. The third query response QRR3 instructs unsuccessful creation of the first enrichment information job object OB1 and includes the enrichment information type, the object identity of the first enrichment information job object OB1, and the job content of the first enrichment information job object OB1.

Thereafter, in step S717, in response to the enrichment information handling circuit 401 receives the third query response QRR3, the enrichment information handling circuit 401 may send a second creation response CRR2 to the first application 407. The second creation response CRR2 instructs that the first enrichment information job object OB1 is not successfully created.

In FIG. 7A and FIG. 7B, the first application 407 and the enrichment information handling circuit 401 may send various requests/responses/messages as shown through APIs related to the enrichment information. Besides, the first application 407, the enrichment information handling circuit 401, and the enrichment information connection interface 405 may individually exchange various data as shown with the database 403 through APIs related to the SDL. Moreover, the enrichment information handling circuit 405 and the enrichment information connection interface 405 may send various requests/responses/messages as shown through APIs related to the A1 interface.

Figure 8:
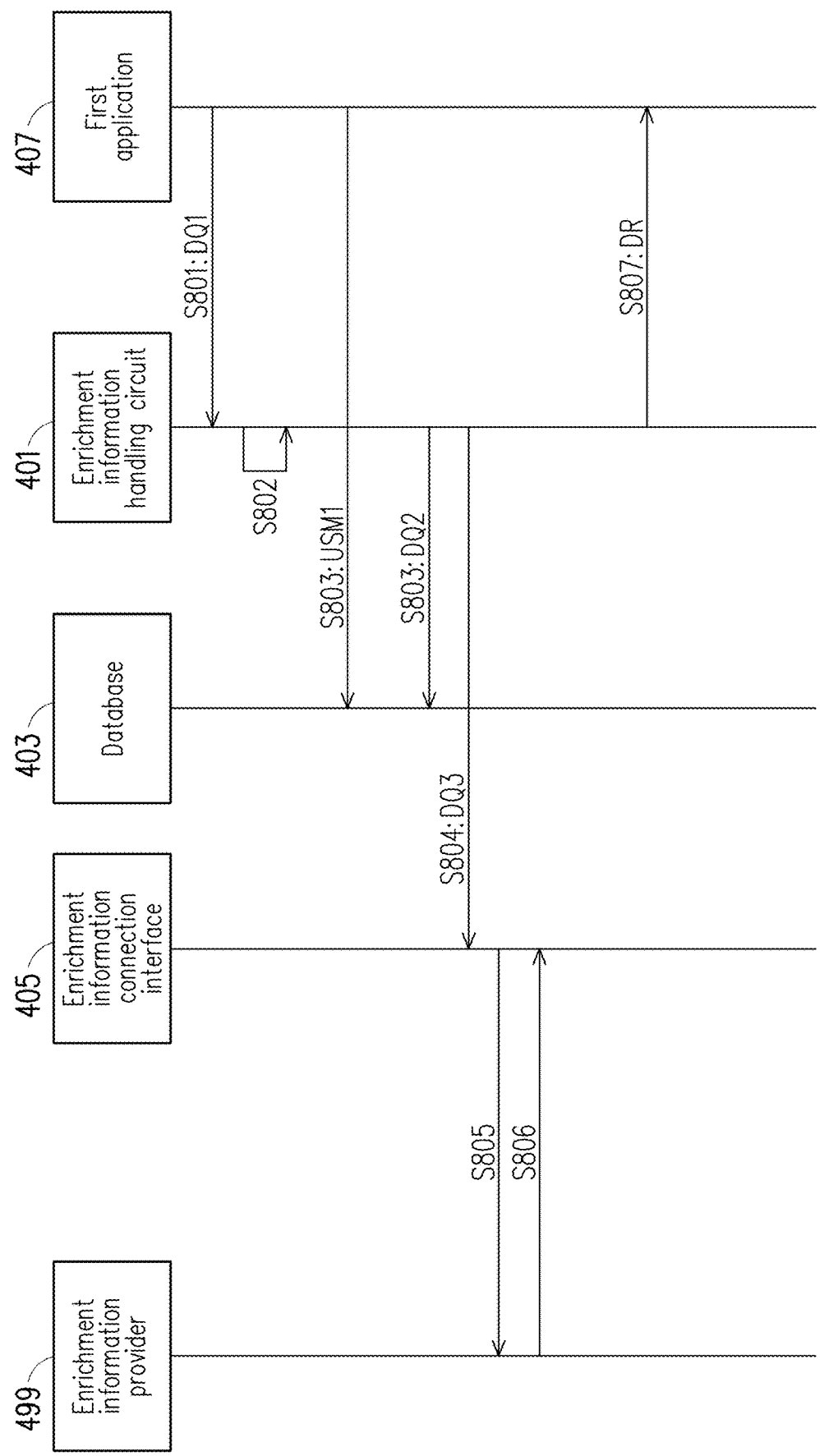
FIG. 8 is a diagram illustrating an application scenario according to a third embodiment of the disclosure.

With reference to FIG. 8, which is a diagram illustrating an application scenario according to a third embodiment of the disclosure. In this embodiment, when the first application 407 intends to stop tracking the enrichment information of the first user device D1, the first application 407 may send a first delete request DQ1 to the enrichment information handling circuit 401 in step S801 to request deletion of the first enrichment information job object OB1.

Next, in step S802, in response to the enrichment information handling circuit 401 receives the first delete request DQ1 of deleting the first enrichment information job object OB1 from the first application 407, the enrichment information handling circuit 401 may cancel tracking of the enrichment information of the first user device by the first application 407.

Moreover, in step S803, the first application 407 may send a first subscription cancellation message USM1 to the database 403. The first subscription cancellation message USM1 instructs to unsubscribe to the database 403 for the enrichment information corresponding to the first user device D1.

In an embodiment, after receiving the first delete request DQ1, the enrichment information handling circuit 401 may determine whether other applications in the controller 400 still need to access the enrichment information of the first user device D1.

In an embodiment, if other applications in the controller 400 still need to access the enrichment information of the first user device D1, the enrichment information handling circuit 401 may not continue to request the enrichment information provider 499 to delete the first enrichment information job object OB1 through the enrichment information connection interface 405.

In another embodiment, if there is no other application in the controller 400 that needs to access the enrichment information of the first user device D1, the enrichment information handling circuit 401 may send a second deletion request DQ2 to the database 403 in step S803. The second delete request DQ2 includes the object identity of the first enrichment information job object OB1.

In addition, if there is no other application in the controller 400 that needs to access the enrichment information of the first user device D1, the enrichment information handling circuit 401 may further send a third deletion request DQ3 to the enrichment information connection interface 405 in step S804. The third delete request DQ3 includes the object identity of the first enrichment information job object OB1.

Correspondingly, in step S805, the enrichment information connection interface 405 may request the enrichment information provider 499 maintaining the first enrichment information job object OB1 to delete the first enrichment information job object OB1 in response to the third delete request DQ3. In an embodiment, after the enrichment information provider 499 deletes the first enrichment information job object OB1, a third response message RM3 may be returned in step S806 to notify the enrichment information connection interface 405.

In step S807, the enrichment information handling circuit 401 may send a delete success response DR to the first application 407. The delete success response DR instructs that the first enrichment information job object OB1 is deleted.

In FIG. 8, the first application 407 and the enrichment information handling circuit 401 may send various requests/responses/messages as shown through APIs related to the enrichment information. Besides, the first application 407, the enrichment information handling circuit 401, and the enrichment information connection interface 405 may individually exchange various data as shown with the database 403 through APIs related to the SDL. Moreover, the enrichment information handling circuit 401 and the enrichment information connection interface 405 may send various requests/responses/messages as shown through APIs related to the A1 interface.

Through the mechanism taught in the foregoing embodiments, it can be seen that in the disclosure, the xApps may conveniently and effectively create/delete the enrichment information job object and obtain the interface/mechanism/procedure of the enrichment information. In this way, the xApps may further execute other applications based on the obtained enrichment information.

For instance, when a communication device is moving, its serving base station may need to be handed over to a target base station through a handover procedure as the communication device moves. The principle of determining whether to handover the communication device to the target base station is based on the difference of the reference signal receiving power (RSRP) measured by the communication device on the serving base station and other neighbor base stations.

In applications such as a flying machine racing competition, the lens image of the flying machine (a user device, for example) needs to be transmitted to the person controlling the flying machine through relevant mobile communication technology (e.g., the 4th/5th generation communication system (hereinafter referred to as 4G/5G)). In the competition venue, there are other devices other than the flying machine that need to be connected to the 4G/5G network, so two small base stations may be required to be set up.

Generally, there are no large-scale shelters in the competition field of the flying machines, so the junction of the two base stations may be set as the handover zone. In this scenario, the difference between the RSRP received by the flying machine from the two base stations is only a decimal level, but the RSRP must be an integer value in the format of the related measurement report defined in the 4G/5G system standard. Besides, coupled with the environmental changes and measurement errors that may be caused by random factors, it may lead to inaccurate handover decisions and delays. In the flying machine racing application scenarios where fast speed is required, improper handover or handover failure may lead to delay or intermittent transmission of the lens image of the flying machine, and control accuracy of the flying machine and competition results may thus be affected.

In the case that RSRP is not appropriate as a method for handover judgment, if the accurate location of the flying machine may be obtained, the handover judgment procedure should be made more accurate, and the above situation is thus prevented from occurring.

Figure 9A:
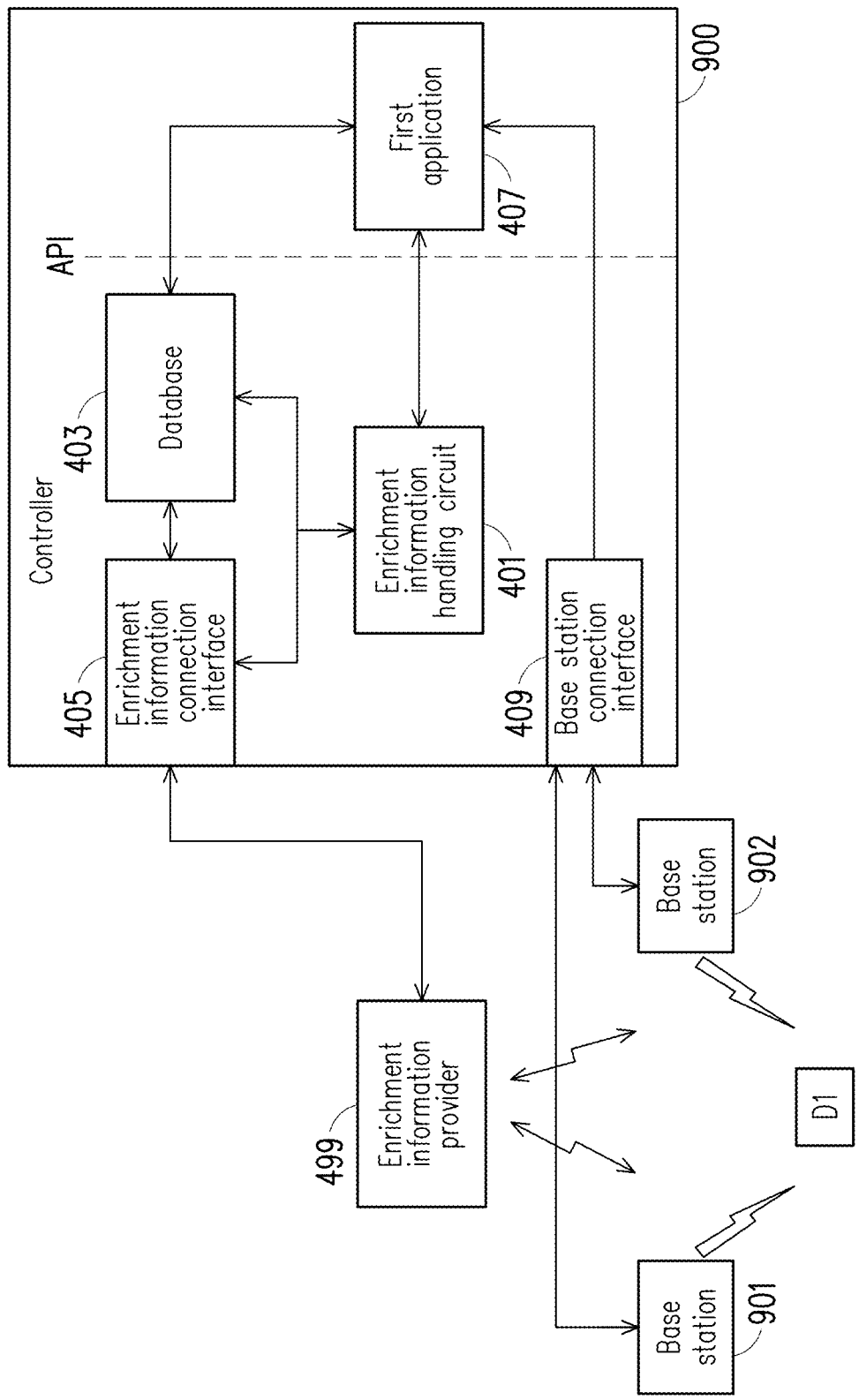
FIG. 9A and FIG. 9B are diagrams illustrating application scenarios according to an exemplary embodiment of the disclosure.
Figure 9B:
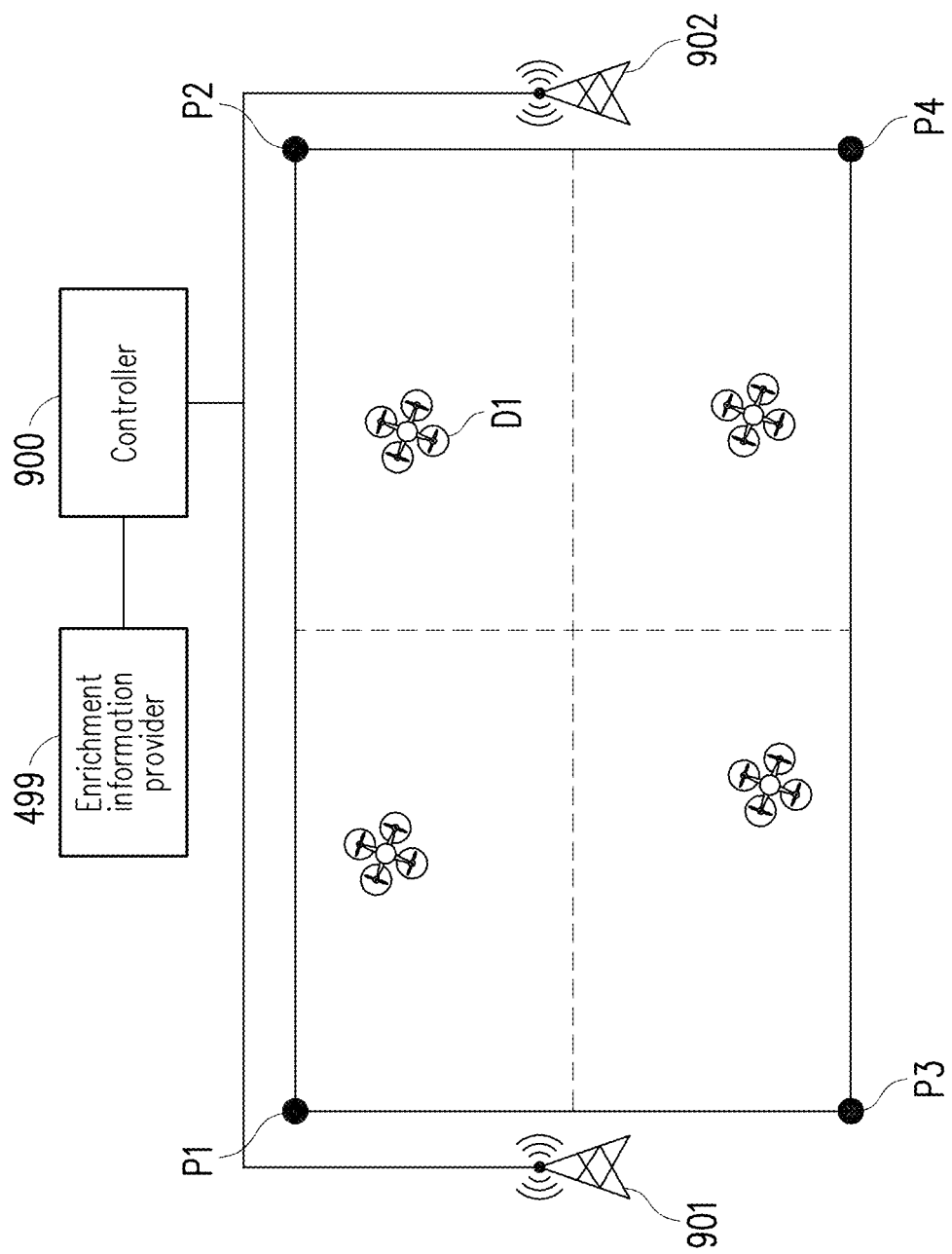

With reference to FIG. 9A and FIG. 9B, which are diagrams illustrating application scenarios according to an exemplary embodiment of the disclosure. In FIG. 9A and FIG. 9B, it is assumed that the first user device D1 is the above-mentioned flying machine, and the first user device D1 may be equipped with a lens and a communication circuit. The communication circuit is, for example, a circuit capable of performing 4G/5G communication and may be used to stream an image captured by the lens to a person controlling the first user device D1, but it is not limited thereto. In addition, a base station 901 and a base station 902 are, for example, 4G/5G base stations installed in a flying machine competition field 999.

Further, compared to the controller 400 in FIG. 4, a controller 900 in FIG. 9 may further include a base station connection interface 409 connected to the base stations 901 and 902.

In FIG. 9A and FIG. 9B, a location detection device may be installed on the first user device D1, which can measure the location of the first user device D1 in the flying machine competition field 999 through technologies such as ultra wideband (UWB), Bluetooth, Zigbee, etc., for example. In an embodiment, a plurality of anchor stations P1 to P4 may be provided in the flying machine competition field 999, which may individually emit beacon signals. In this case, the location detection device may perform triangulation based on these beacon signals, so as to detect the location of the first user device D1 in the flying machine competition field 999 and correspondingly send this location to the enrichment information provider 499.

In an embodiment, the enrichment information provider 499 may treat the location of the first user device D1 as the enrichment information corresponding to the first user device D1 and provide it to the controller 900, so that the controller 900 is allowed to execute a handover policy associated with the first user device D1.

In an embodiment, since the controller 900 may not know that the communication circuit on the first user device D1 corresponds to the enrichment information provided by the location detection device, the controller 900 may perform the following operations first, to find the association between the communication circuit and the enrichment information.

In an embodiment, the enrichment information handling circuit 401 may receive a reference signal power sequence of a plurality of nearby base stations measured by the communication circuit from the base station connection interface 409b. In an embodiment, assuming that there are k base stations near the communication circuit, and the reference signal power sequence from the $t^{th}$ time point to the t-$M^{th}$ time point may be characterized as R={$R_{BS1}(t)$, $R_{BS2}(t)$, ..., $R_{BSk}(t)$, $R_{BS1}(t-1)$, $R_{BS2}(t-1)$, ..., $R_{BSk}(t-1)$, ..., $RR_{BS1}(-t\ M)$, $R_{BS2}(t-M)$, ..., $R_{BSk}(t-M)$}.

Further, the enrichment information handling circuit 401 may receive the enrichment information (i.e., the location of the first user device D0 of the first user device D1 provided by the enrichment information provider 499 from the enrichment information connection interface 405. In an embodiment, the location from the $t^{th}$ time point to the t-$N^{th}$ time point of the first user device D1 may be characterized as P={x(t), y(t), z(t), x(t-1), y(t-1), z(t-1), ..., x(t-N), y(t-N), z(t-N)}.

Next, the enrichment information handling circuit 401 may build a specific association between the enrichment information of the first user device D1 and the communication circuit based on the reference signal power sequence (i.e., R) and the enrichment information (i.e., P) of the first user device D1 and records the specific association into the database 403.

In an embodiment, the enrichment information handling circuit 401 may input R and P into a classifier, where the classifier may be implemented as a first neural network. In an embodiment, an input layer of the first neural network may be the aforementioned R and P, and a dimension of the input layer may be a (k(M+1)+3(N+1)) vector. Besides, an output layer dimension of the first neural network may be 2, representing Class 1 and Class 0. In some embodiments, the first neural network may further include a plurality of hidden layers, but it is not limited thereto.

In an embodiment, after the enrichment information handling circuit 401 inputs R and P into the classifier, if an output value of Class 1 is greater than an output value of Class 0, the enrichment information handling circuit 401 may determine that a specific association is provided between R and P and may record the specific association into the database 403. In contrast, if the output value of Class 1 is not greater than the output value of Class 0, the enrichment information handling circuit 401 may determine that a specific association is not provided between R and P.

In an embodiment, supervised learning may be adopted for the training of the first neural network, and a plurality of sets of location data and their corresponding RSRP data may be retrieved in advance. In the process of training this first neural network, when the inputted location data is its corresponding RSRP data, the output value of Class 1 is 1 and the output value of Class 0 is 0, and when the inputted location data is not its corresponding RSRP data, the output value of Class 1 is 0 and the output value of Class 0 is 1, but it is not limited thereto.

In another embodiment, the enrichment information handling circuit 401 may input R and P into a correlator, where the correlator may be implemented as a second neural network. In an embodiment, an input layer of the second neural network may be the aforementioned R and P, and the dimension of the input layer may be a (k(M+1)+3(N+1)) vector. Besides, the output layer dimension of the second neural network may be 1, representing correlation (between 0 and 1). In some embodiments, the output layer may be implemented through selection of an activation function that meets this range, such as a Sigmoid function, but it is not limited thereto. In some embodiments, the second neural network may further include a plurality of hidden layers, but it is not limited thereto.

In an embodiment, supervised learning may be adopted for the training of the second neural network, and a plurality of sets of location data and their corresponding RSRP data may be retrieved in advance. In the process of training this second neural network, when the inputted location data is its corresponding RSRP data, the output value is 1, and when the inputted location data is not its corresponding RSRP data, the output value is 0, but it is not limited thereto.

In the scenarios of FIG. 9A and FIG. 9B, since the enrichment information of the first user device D1 is assumed to be the location of the first user device D1, the information format type in the corresponding first enrichment information job object OB1 may instruct the location of the first user device D1 in terms of coordinates or latitude and longitude. Besides, the reply instruction in the first enrichment information job object OB1 may instruct whether to reply to the location of the first user device D1 immediately. The reply period in the first enrichment information job object OB1 may instruct a period for replying the location of the first user device D1. The timestamp instruction in the first enrichment information job object OB1 may instruct whether to mark the location of the first user device D1 with a corresponding timestamp.

In an embodiment, assuming that the first enrichment information job object OB1 is provided with the form illustrated in Table 1 below, and the enrichment information of the corresponding first user device D1 may be provided with the content illustrated in Table 2 below.

TABLE 1

First enrichment information job object

| Enrichment information type | | UePosition-v1.0 |
|---|---|---|
| Job return URL | | https://eiJob/1/result |
| Job status reminder URL | | https://eiJob/1/status |
| Job definition | Information format type | Location format 1 (i.e., coordinates) |
| | Whether to reply immediately | No |
| | Reply period | 100 (milliseconds) |
| | Whether to add a timestamp | Yes |

TABLE 2

Enrichment information of first user device D1

| Device identity | | 1234567 |
|---|---|---|
| Location format 1 | x axis | 35 |
| | y axis | 25 |
| | z axis | 4 |
| Timestamp | seconds | 3 |
| | milliseconds | 100 |

In an embodiment, the controller 900 may determine whether the communication circuit needs to be handed over from a serving base station (e.g., the base station 901) among the aforementioned base stations) to a target base station (e.g., the base station 902) according to the enrichment information (i.e., location) of the first user device D1. In response to determining that the communication circuit needs to be handed over from the serving base station to the target base station, the controller 900 may, through the base station connection interface 409, control the serving base station to handover the communication circuit to the target base station. For instance, when the controller 900 determines that the location of the first user device D1 is located at the junction of the base stations 901 and 902, the controller 900 may determine that the communication circuit needs to be handed over from the serving base station to the target base station and further controls the serving base station to handover the communication circuit to the target base station through the base station connection interface 409, but it is not limited thereto.

In other embodiments, the concepts of FIG. 9A and FIG. 9B may also be applied to other occasions. For instance, when a self-driving car moves in a specific field, the controller 900 that manages the self-driving car may determine whether to perform a handover operation for the self-driving car according to the above teachings and the enrichment information (e.g., location) of the self-driving car.

In view of the foregoing, through the mechanism provided by the embodiments of the disclosure, the applications in the RIC may conveniently and effectively create/delete the enrichment information job object and obtain the interface/mechanism/procedure of the enrichment information. In this way, the applications in the RIC may further execute other applications based on the obtained enrichment information.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for obtaining enrichment information, applied to a controller comprising an enrichment information handling circuit and a database, the method comprising:
querying, by the enrichment information handling circuit of the controller, whether the database stores a first enrichment information corresponding to a first user device in response to the enrichment information handling circuit receiving, via an application programming interface (API), a first creation request associated with the first user device from a first application run by the controller, wherein the controller is a radio access network (RAN) intelligent controller (RIC), and the first application realizes a radio resource management (RRM) function of the RIC;
triggering, by the enrichment information handling circuit of the controller, the first application to subscribe to the database for enrichment information corresponding to the first user device in response to determining that the database stores the first enrichment information corresponding to the first user device; and
pushing, by the database of the controller via the API, a second enrichment information to the first application in response to presence of the second enrichment information corresponding to the first user device in the database.

2. The method according to claim 1, wherein the first creation request instructs at least one of an enrichment information type, a device identity of the first user device, an enrichment information format, a reply instruction, a reply period, and a timestamp instruction.

3. The method according to claim 2, wherein the first creation request is configured to request creation of a first enrichment information job object corresponding to the first user device, and the first enrichment information job object comprises at least one of the enrichment information type, a job return URL, a job status reminder URL, an information format type, the reply instruction, the reply period, and the timestamp instruction.

4. The method according to claim 1, wherein the first creation request is configured to request creation of a first enrichment information job object corresponding to the first user device, and the step of querying, by the enrichment information handling circuit, whether the database stores the first enrichment information corresponding to the first user device further comprises:
- sending, by the enrichment information handling circuit, a first query request to the database in response to the first creation request, wherein the first query request is configured to query whether the database stores the first enrichment information corresponding to the first user device.

5. The method according to claim 4, further comprising:
- querying, by the database, whether the database stores the first enrichment information corresponding to the first user device in response to the first query request and sending a first query response to the enrichment information handling circuit according to a first query result of the first query request.

6. The method according to claim 4, wherein the first query request comprises a device identity of the first user device and an object identity of the first enrichment information job object, and the first query response comprises the device identity of the first user device, the object identity of the first enrichment information job object, and a query status field, wherein the query status field instructs whether the database stores the first enrichment information corresponding to the first user device.

7. The method according to claim 5, further comprising:
- determining, by the enrichment information handling circuit, that the database stores the first enrichment information corresponding to the first user device in response to the enrichment information handling circuit determining that the first query response instructs that the database stores the first enrichment information corresponding to the first user device, wherein the step of triggering, by the enrichment information handling circuit, the first application to subscribe to the database for the enrichment information corresponding to the first user device further comprises:
- sending, by the enrichment information handling circuit, a first creation response to the first application, wherein the first application sends a first tracking message corresponding to the first enrichment information job object to the enrichment information handling circuit in response to the first application determining that the first creation response instructs that the first enrichment information job object is successfully created, and the first tracking message instructs an object identity of the first enrichment information job object and is configured to register and track the enrichment information of the first user device with the enrichment information handling circuit.

8. The method according to claim 7, wherein the first creation response comprises an enrichment information type, the object identity of the first enrichment information job object, job content of the first enrichment information job object, and a creation status field, wherein the creation status field instructs whether the first enrichment information job object is successfully created.

9. The method according to claim 7, wherein after the first application sends the first tracking message, the method further comprises:
- sending, by the first application, a first subscription message to the database, wherein the first subscription message instructs to subscribe to the database for the enrichment information corresponding to the first user device.

10. The method according to claim 5, further comprising:
- determining, by the enrichment information handling circuit, that the database does not store the first enrichment information corresponding to the first user device in response to the enrichment information handling circuit determining that the first query response instructs that the database does not store the first enrichment information corresponding to the first user device, wherein the method further comprises:
- sending, by the enrichment information handling circuit, a second query request to an enrichment information connection interface of the controller, wherein the second query request instructs an enrichment information type; and
- querying, by the enrichment information connection interface, whether an enrichment information provider supports the enrichment information type.

11. The method according to claim 10, further comprising:
- requesting, by the enrichment information connection interface, the enrichment information provider to create the first enrichment information job object in response to the enrichment information provider notifying the enrichment information connection interface that the enrichment information provider supports the enrichment information type; and
- sending, by the enrichment information connection interface, a second query response to the enrichment information handling circuit in response to the enrichment information provider notifying the enrichment information connection interface of creation of the first enrichment information job object.

12. The method according to claim 11, wherein the second query response comprises the enrichment information type, object identity of the first enrichment information job object, and job content of the first enrichment information job object.

13. The method according to claim 11, further comprising:
- determining, by the enrichment information handling circuit, that the database stores the first enrichment information corresponding to the first user device in response to receiving the second query response, wherein the step of triggering, by the enrichment information handling circuit, the first application to subscribe to the database for the enrichment information corresponding to the first user device further comprises:
- sending, by the enrichment information handling circuit, a first creation response to the first application, wherein the first application sends a first tracking message corresponding to the first enrichment information job object to the enrichment information handling circuit in response to the first application determining that the first creation response instructs that the first enrichment information job object is successfully created, and the first tracking message instructs an object identity of the first enrichment information job object.

14. The method according to claim 13, wherein after the first application sends the first tracking message, the method further comprises:
- sending, by the first application, a first subscription message to the database, wherein the first subscription message instructs to subscribe to the database for the enrichment information corresponding to the first user device.

15. The method according to claim 10, further comprising:
sending, by the enrichment information connection interface, a third query response to the enrichment information handling circuit in response to the enrichment information provider notifying the enrichment information connection interface that the enrichment information provider does not support the enrichment information type.

16. The method according to claim 15, further comprising:
sending, by the enrichment information handling circuit, a second creation response to the first application in response to the enrichment information handling circuit receiving the third query response, wherein the second creation response instructs that the first enrichment information job object is not successfully created.

17. The method according to claim 1, wherein after the step of triggering, by the enrichment information handling circuit, the first application to subscribe to the database for the enrichment information corresponding to the first user device, the method further comprises:
storing, by an enrichment information connection interface of the controller, the second enrichment information to the database in response to the enrichment information connection interface receiving the second enrichment information from an enrichment information provider.

18. The method according to claim 17, wherein the second enrichment information comprises a device identity of the first user device, status information of the first user device, and a timestamp.

19. The method according to claim 18, wherein the status information of the first user device comprises location information of the first user device corresponding to the timestamp.

20. The method according to claim 7, wherein after the step of sending, by the first application, the first tracking message corresponding to the first enrichment information job object to the enrichment information handling circuit, the method further comprises:
canceling, by the enrichment information handling circuit, tracking of the enrichment information of the first user device by the first application in response to the enrichment information handling circuit receiving a first delete request of deleting the first enrichment information job object from the first application; and
sending, by the first application, a first subscription cancellation message to the database, wherein the first subscription cancellation message instructs to unsubscribe to the database for the enrichment information corresponding to the first user device.

21. The method according to claim 19, further comprising:
sending, by the enrichment information handling circuit, a second delete request to the database in response to the enrichment information handling circuit determining that no other application tracks the first enrichment information job object, wherein the second delete request comprises the object identity of the first enrichment information job object; and
sending, by the enrichment information handling circuit, a delete success response to the first application, wherein the delete success response instructs that the first enrichment information job object is deleted.

22. The method according to claim 21, further comprising:
sending, by the enrichment information handling circuit, a third delete request to an enrichment information connection interface of the controller in response to the enrichment information handling circuit determining that no other application tracks the first enrichment information job object; and
requesting, by the enrichment information connection interface, an enrichment information provider maintaining the first enrichment information job object to delete the first enrichment information job object in response to the third delete request.

23. The method according to claim 1, wherein the first user device is provided with a communication circuit, and the method further comprises:
receiving, by the enrichment information handling circuit, a reference signal power sequence of a plurality of base stations measured by the communication circuit from a base station connection interface of the controller;
receiving, by the enrichment information handling circuit, the enrichment information of the first user device provided by an enrichment information provider from an enrichment information connection interface of the controller; and
building, by the enrichment information handling circuit, a specific association between the enrichment information of the first user device and the communication circuit based on the reference signal power sequence and the enrichment information of the first user device and recording the specific association into the database.

24. The method according to claim 23, wherein the enrichment information of the first user device instructs a location of the first user device, and the method further comprises:
determining whether the communication circuit needs to be handed over from a serving base station among the base stations to a target base station among the base stations according to the enrichment information of the first user device; and
controlling, through the base station connection interface, the serving base station to handover the communication circuit to the target base station in response to determining that the communication circuit needs to be handed over from the serving base station to the target base station.

25. A controller for obtaining enrichment information, comprising:
a database; and
an enrichment information handling circuit, coupled to the database,
wherein the enrichment information handling circuit queries whether the database stores a first enrichment information corresponding to a first user device in response to the enrichment information handling circuit receiving, via an application programming interface (API), a first creation request associated with the first user device from a first application run by the controller, wherein the controller is a radio access network (RAN) intelligent controller (RIC), and the first application realizes a radio resource management (RRM) function of the RIC,
the enrichment information handling circuit triggers the first application to subscribe to the database for enrichment information corresponding to the first user device in response to determining that the database stores the first enrichment information corresponding to the first user device, and the database pushes, via the API, a second enrichment information to the first application in response to presence of the second enrichment information corresponding to the first user device in the database.

* * * * *